March 16, 1943. A. H. TOEPFER 2,313,978
OSCILLOGRAPH VIEWING DEVICE
Filed April 24, 1940
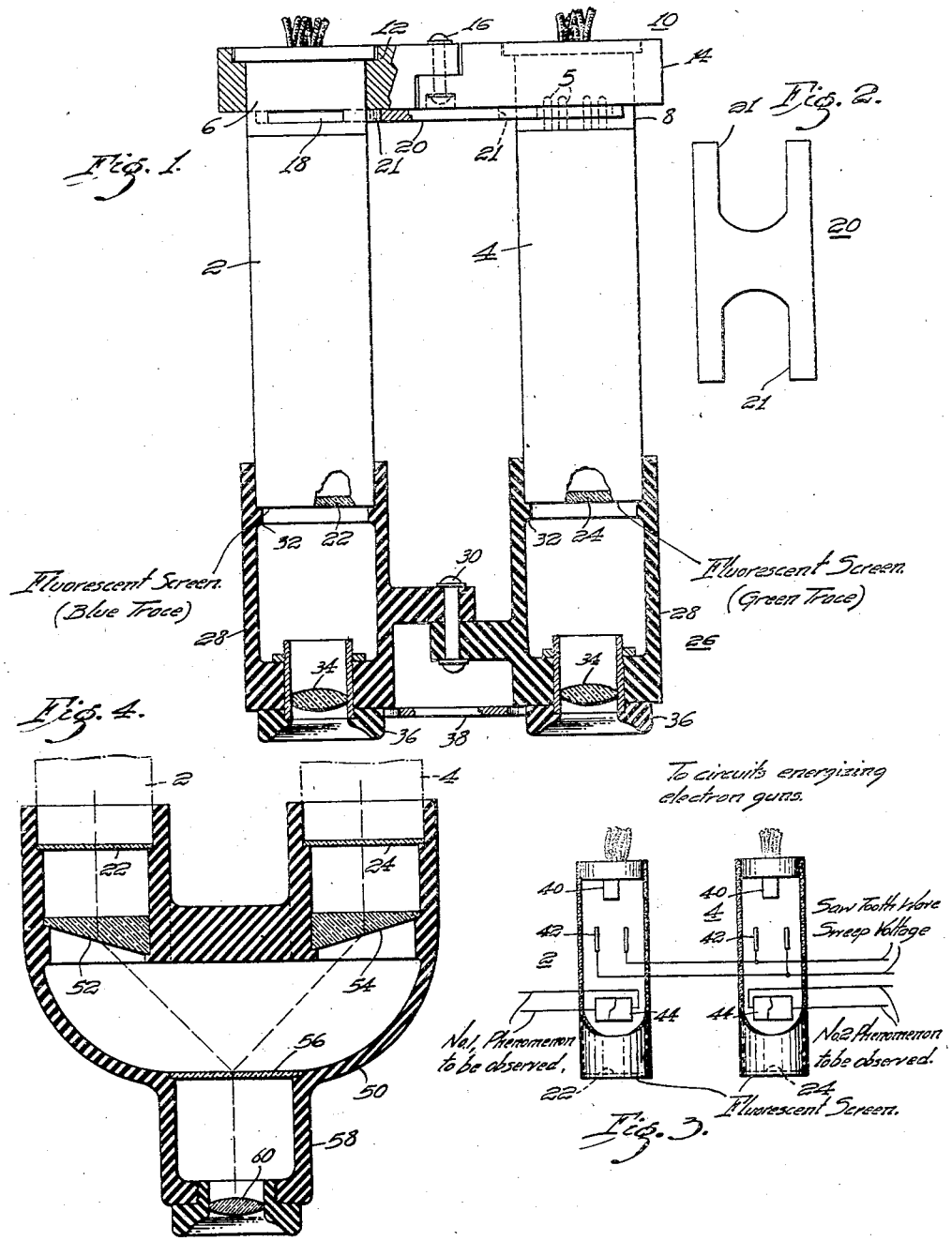
WITNESSES:
INVENTOR
Adolph H. Toepfer
ATTORNEY Patented Mar. 16, 1943

2,313,978

UNITED STATES PATENT OFFICE 2,313,978

OSCILLOGRAPH VIEWING DEVICE

Adolph H. Toepfer, Wilkinsburg, Pa., assignor to Westinghouse Electric & Manufacturing Company, East Pittsburgh, Pa., a corporation of Pennsylvania Application April 24, 1940, Serial No. 331,362

2 Claims. (Cl. 171—95)

The present invention relates to oscillograph equipment and it has particular relation to a device which permits the comparison of electrical phenomena by simultaneous observation of a plurality of oscillograph screens.

Although there are many situations in which it is desirable to observe and compare simultaneous electrical phenomena, it is difficult to view two oscillograph screens with the unaided eyes. As a result of this difficulty, very expensive multiple beam tubes have been built to facilitate such comparison. Arrangements employing synchronous switches of mechanical and electronic types have also been utilized but have not proven satisfactory.

According to the present invention, an optical system is employed with a pair of individual cathode ray oscillograph tubes to permit observation of the traces thereon in visually superimposed relationship. In one embodiment, a stereoscopic arrangement is employed for this purpose, while in another arrangement, the images of the traces on the two screens are superimposed upon a ground glass screen. To facilitate comparison, oscillograph tubes having screens which produce traces of different colors may be employed. Since the advent of small inexpensive cathode ray tubes on the market, the application of the invention will be found inexpensive as well as accurate and convenient.

It is accordingly an object of the present invention to provide an improved method and means for comparing electrical phenomena.

It is another object of the invention to provide a device whereby the traces on a plurality of cathode ray tubes may be visually superimposed to facilitate comparison of the quantities producing the traces.

Another object of the invention is to provide an arrangement for comparing electrical quantities in which a stereoscopic device is employed to visually superimpose the traces produced on a pair of cathode ray oscillographs.

A further object of the invention is to provide an arrangement for comparing a pair of electrical quantities in which an optical system is utilized to produce superimposed images of the traces on the screens of a pair of cathode ray oscillographs.

Other objects and advantages of the invention will appear from the following detailed description, taken in conjunction with the accompanying drawing, in which:

Figure 1 is a top plan view, with parts broken away of a device embodying the invention;

Fig. 2 is a side view of the positioning plate employed in the device of Fig. 1;

Fig. 3 is a partly sectional and partly diagrammatical view showing the electrical connections employed with the cathode ray tubes of Fig. 1; and Fig. 4 is a horizontal sectional view illustrating a modification of the invention.

In Fig. 1, there is shown two cathode ray tubes 2 and 4 seated by means of contact plugs 5 in sockets 6 and 8, respectively. The sockets 6 and 8 are somewhat loosely fitted in apertures in a supporting frame 10 to permit movement relative thereto. The base 10 is preferably of wood or plastic material and is made up of two sections 12 and 14 pivotally secured together by a bolt 16 to permit adjustment of the distance between the tubes 2 and 4. The sockets are each slotted at the top and bottom to present parallel flat portions, one of which is shown at 18. A positioning plate 20, which is more clearly shown in Fig. 2, is disposed adjacent the front of the frame 10 and bifurcated at its ends 21 to receive the sockets 6 and 8. The bifurcations 21 have parallel sides and are of such width as to fit snugly yet slidably against the flat surfaces 18 of the sockets thereby retaining the two tubes in the same relative transverse axial positions regardless of any adjustment of the distance between them.

The tubes 2 and 4, respectively, are provided with fluorescent screens 22 and 24. To facilitate comparison of the indications on these screens, they are preferably such as to produce traces of different colors, as for example, the screen 22 may produce a blue trace while the screen 24 supplies a green trace.

Secured on the ends of these oscillograph tubes is a frame 26 for supporting an optical system. This frame may be made of plastic material and include two tubular portions 28 hinged together at 30. These tubular portions 28 are provided with shoulders 32 which engage the ends of the tubes to insure proper positioning thereon.

The optical system includes a pair of lenses 34, each of which is fitted within an eye piece 36. Each of these eye pieces, in turn, is rotatably fitted in one of the tubular members 28 in association with the corresponding oscillograph tube screen. The upper and lower sides of these eye pieces may be provided with flat portions similar to those in the sockets 6 and 8 to permit engagement by a second positioning plate 38 similar to that illustrated in Fig. 2. The lenses 34 are arranged to operate in a manner similar to the well known stereoscope to cause images of the screens 22 and 24 to appear in visually superimposed relationship to one observing through the eye pieces 36. The plate 38 automatically retains the lenses 34 in the proper axial position upon adjustment being made in the distance between eye pieces.

As is shown in Fig. 3, each of the tubes includes in addition to the screen 22 or 24, an electron gun 40 which may be of any known type which produces electrons and accelerates them axially through the tube toward the respective screens. In addition, sets of deflecting plates 42 are provided to sweep the respective electron beams in a horizontal direction. These sweep plates are preferably energized in parallel by means of a saw-tooth electric wave produced in a known manner as by causing periodic breakdown of a neon tube. In addition, each oscillograph includes a pair of deflecting plates 44 for deflecting the electron beam in a vertical plane. The plates 44 of tube 2 are energized by one of the phenomena which is being observed while those of the tube 4 are energized from the phenomena which is to be compared thereto.

By employing the same sweep voltage for both tubes, it will be apparent that the electron beams may be swept in synchronism through the horizontal plane. Any suitable adjustments may be employed for bringing the phenomena undergoing comparison into the desired phase relationship. While means have been described for automatically retaining the apparatus in proper electronic and optical relationship despite adjustments in the distances between eye pieces, it will be evident that the rotating positions of the tubes and eye pieces may be individually controlled instead if desired.

In Fig. 4 is shown an embodiment of the invention in which the images of the two traces are actually superimposed and may be observed with a single eye. In this case, a frame 50 is secured to the oscillograph tubes 2 and 4 in a manner similar to that previously described. This frame is preferably of plastic material and supports lenses 52 and 54 which are associated with the respective oscillograph screens to focus images thereof on the ground glass plate 56 in superimposed relationship. A frame 50 includes an eye piece portion 58 associated with the plate 56. If desired, a magnifying lens 60 may be provided in the eye piece. For this embodiment of Fig. 4, the same electrical connections shown in Fig. 3 may be employed. If desired traces of more than two phenomena may be superimposed on the plate 56 by providing additional oscillographs.

From the above description, it will appear that the present invention provides an inexpensive and practical method for comparing simultaneous electrical quantities such as fast non-recurring phenomena. The small size cathode ray tubes which are now on the market and produce traces of different colors may be conveniently used to produce a device which, in addition, is relatively compact.

Since modifications of the invention will appear to those skilled in the art, it is intended that the invention shall be limited only by the following claims interpreted in view of the prior art.

I claim as my invention:

1. In apparatus for comparing periodically varying electrical quantities, a pair of cathode ray tubes each including a tracing surface and means for projecting an electron beam thereon, means energizable to deflect the electron beams in each of said tubes periodically along a predetermined axis of the corresponding tracing surface in synchronism, each of said tubes including means energizable from a periodically varying electrical quantity to be observed to deflect the corresponding electron beam along another axis of its tracing surface to produce thereon a trace corresponding to the variations of said quantity, a casing device including an opaque tubular member engaging each of said tubes about its tracing surface and means interconnecting said tubes to maintain said tracing surfaces in a predetermined relationship with each other with their first said axes in alignment, and optical means within said tubular members to permit observation of said tracing surfaces through the outer ends of said tubular members in visually superimposed relationship.

2. In apparatus for comparing periodically varying electrical quantities, a pair of cathode ray tubes each including a tracing surface at one end thereof and means for projecting an electron beam thereon, means energizable to deflect the electron beams in each of said tubes periodically along a predetermined axis of the corresponding tracing surface in synchronism, each of said tubes including means energizable from a periodically varying electrical quantity to be observed to deflect the corresponding electron beam along another axis of its tracing surface to produce thereon a trace corresponding to the variations of said quantity, said tracing surfaces being such as to produce traces of different colors, an opaque tubular eye piece engaging each of said tubes about the end adjacent its tracing surface and extending outwardly therefrom along its axis to permit observation of said tracing surface in visually superimposed relationship therethrough, means for pivotally securing said tubular eye pieces together to maintain said tubes and tubular eye pieces in parallel relationship an adjustable distance apart, and means for maintaining said tubes in position with their first said predetermined axes in alignment regardless of the adjustment of the means securing said eye pieces together.

ADOLPH H. TOEPFER.